(12) United States Patent
Henry

(10) Patent No.: US 10,500,671 B2
(45) Date of Patent: Dec. 10, 2019

(54) SYSTEM AND METHOD FOR ARC WELDING AND WIRE MANIPULATION CONTROL

(71) Applicant: LINCOLN GLOBAL, INC., Santa Fe Springs, CA (US)

(72) Inventor: Judah Henry, Geneva, OH (US)

(73) Assignee: LINCOLN GLOBAL, INC., Santa Fe Springs, CA (US)

(*) Notice: Subject to any disclaimer, the term of this patent is extended or adjusted under 35 U.S.C. 154(b) by 205 days.

(21) Appl. No.: 15/481,251

(22) Filed: Apr. 6, 2017

(65) Prior Publication Data

US 2018/0290228 A1 Oct. 11, 2018

(51) Int. Cl.
- *B23K 9/09* (2006.01)
- *B23K 9/12* (2006.01)
- *B23K 9/073* (2006.01)
- *B23K 9/095* (2006.01)

(52) U.S. Cl.
CPC ............ *B23K 9/125* (2013.01); *B23K 9/073* (2013.01); *B23K 9/09* (2013.01); *B23K 9/0953* (2013.01)

(58) Field of Classification Search
CPC . B23K 9/00; B23K 9/09; B23K 9/095; B23K 9/0953; B23K 9/073; B23K 9/12; B23K 9/124; B23K 9/125
USPC ....... 219/137.7, 137.71, 137.2, 130.1, 130.5, 219/130.51
See application file for complete search history.

(56) References Cited

U.S. PATENT DOCUMENTS

| | | | |
|---|---|---|---|
| 1,840,735 A | 1/1932 | Osborne |
| 2,073,603 A | 3/1937 | Seckman |
| 2,163,863 A | 6/1939 | Biederman |
| 2,498,905 A | 2/1950 | Abbott |
| 2,628,302 A | 2/1953 | Tyrner |
| 2,731,536 A | 1/1956 | Laur |
| 3,068,351 A | 12/1962 | Longenecker |
| 3,141,085 A | 7/1964 | Manz |
| 3,277,269 A | 10/1966 | Zeller |
| 3,546,415 A | 12/1970 | Marantz |
| 3,777,110 A | 12/1973 | Yohn |
| 4,283,617 A | 8/1981 | Merrick |
| 4,935,598 A | 6/1990 | Ward |
| 5,191,185 A | 3/1993 | John, Jr. |

(Continued)

FOREIGN PATENT DOCUMENTS

| CN | 2871090 | 2/2007 |
|---|---|---|
| DE | 3609877 | 9/1987 |

(Continued)

OTHER PUBLICATIONS

International Search Report & Written Opinion for corresponding application PCT/IB2013/00165 dated Nov. 21, 2013.

(Continued)

*Primary Examiner* — Dana Ross
*Assistant Examiner* — Ayub A Maye
(74) *Attorney, Agent, or Firm* — David J. Muzilla

(57) ABSTRACT

Embodiments of the present invention are directed to systems and methods of controlling wire feeding in a welding operation, where the wire feeding has a plurality of positive and negative pulses. Embodiments determine an average wire feed speed and compare the average to a desired wire feed speed and then change a parameter of the wire feed pulses to achieve a desired wire feed speed.

20 Claims, 4 Drawing Sheets

(56) References Cited

U.S. PATENT DOCUMENTS

| | | |
|---|---|---|
| 5,275,336 A | 1/1994 | Stasi |
| 5,332,342 A | 7/1994 | Kizaki |
| 5,508,493 A * | 4/1996 | Ueyama ................. B23K 9/091 |
| | | 219/130.51 |
| 5,916,464 A | 6/1999 | Geiger |
| 6,160,241 A | 12/2000 | Stava |
| 6,720,529 B2 | 4/2004 | Davidson |
| 6,742,719 B2 | 6/2004 | Tudor |
| 6,909,067 B2 | 6/2005 | Davidson |
| 6,963,048 B2 | 11/2005 | Huismann |
| 6,969,823 B2 | 11/2005 | Huismann |
| 6,984,806 B2 | 6/2006 | Huismann |
| 7,129,443 B2 | 10/2006 | Davidson |
| 7,138,602 B2 | 11/2006 | Huismann |
| 7,351,933 B2 | 4/2008 | Huismann |
| 7,554,056 B2 | 6/2009 | Huismann |
| 8,598,492 B2 | 12/2013 | Davidson |
| 8,704,131 B2 | 4/2014 | Davidson |
| 9,132,500 B2 * | 9/2015 | Van Boxtel ............. B23K 9/133 |
| 9,498,839 B2 | 11/2016 | Hillen |
| 2001/0009252 A1 * | 7/2001 | Hiraoka ................. B23K 9/173 |
| | | 219/125.12 |
| 2004/0245230 A1 | 12/2004 | Huismann et al. |
| 2005/0016974 A1 * | 1/2005 | Myers ..................... B23K 9/093 |
| | | 219/130.51 |
| 2005/0127862 A1 | 6/2005 | Glasgow |
| 2006/0016792 A1 * | 1/2006 | Uecker ................. B23K 9/0735 |
| | | 219/137.71 |
| 2006/0131293 A1 | 6/2006 | Kaufman |
| 2008/0149608 A1 | 6/2008 | Albrecht |
| 2011/0194973 A1 | 8/2011 | Anderson |
| 2011/0309061 A1 | 12/2011 | Rozmarynowski |
| 2011/0309063 A1 * | 12/2011 | Ott .......................... B23K 9/125 |
| | | 219/137.71 |
| 2012/0111842 A1 * | 5/2012 | Fujiwara ................. B23K 9/125 |
| | | 219/130.33 |
| 2012/0199566 A1 | 8/2012 | Hillen |
| 2013/0068744 A1 * | 3/2013 | Matsui .................... B23K 9/092 |
| | | 219/137 R |
| 2013/0146575 A1 | 6/2013 | Hillen |
| 2013/0228559 A1 * | 9/2013 | Daniel ................. B23K 9/0671 |
| | | 219/130.33 |
| 2014/0069901 A1 | 3/2014 | Davidson |
| 2014/0110385 A1 * | 4/2014 | Hearn .................... B23K 9/091 |
| | | 219/130.1 |
| 2014/0117001 A1 | 5/2014 | Anderson |
| 2014/0158669 A1 | 6/2014 | Davidson |
| 2014/0175074 A1 | 6/2014 | Davidson |
| 2014/0190952 A1 | 7/2014 | Anderson |
| 2014/0263243 A1 | 9/2014 | Marschke et al. |
| 2015/0041449 A1 * | 2/2015 | Fujiwara ................ B23K 9/073 |
| | | 219/130.21 |
| 2017/0001254 A1 | 1/2017 | Ide |

FOREIGN PATENT DOCUMENTS

| | | |
|---|---|---|
| GB | 759122 | 10/1956 |
| JP | S58 167078 A | 10/1983 |
| JP | H05 23851 A | 2/1993 |
| JP | 2000202629 | 7/2000 |
| JP | 2007021542 | 2/2007 |
| JP | 2007260757 | 10/2007 |
| JP | 2015 058439 A | 3/2015 |
| WO | 2011159730 | 12/2011 |
| WO | 2012080796 | 6/2012 |
| WO | 2013117987 | 8/2013 |

OTHER PUBLICATIONS

International Search Report & Written Opinion for corresponding application PCT/IB2013/00165 dated Jun. 28, 2013.

International Search Report & Written Opinion for corresponding application PCT/IB2013/00165 dated Apr. 8, 2014.

The next generation of automated welding systems and standalone components; http://www.ametinc.com/brochures/AMET_XM%20Brochure.pdf, dated Dec. 9, 2010.

Cold Water Feeders, CL Worldwide, http://ckworldwidecom/coldwire.htm, dated Dec. 9, 2010.

PCT/IB2011/002911 International Search Report and Written Opinion of International Search Authority.

Extended European Search Report from Corresponding Application No. 18166097.8; dated Sep. 11, 2018; pp. 1-8.

* cited by examiner

SYSTEM AND METHOD FOR ARC WELDING AND WIRE MANIPULATION CONTROL

TECHNICAL FIELD

Devices, systems, and methods consistent with the invention relate to welding, and more specifically to devices, systems and methods related to control of wire manipulation in a welding operation.

BACKGROUND

In many welding applications, wire manipulation is becoming more popular. Wire manipulation occurs when the consumable wire/electrode is advanced and retracted at different stages during a welding process. For example, in some GMAW/MIG welding operations the electrode is advanced until a short circuit occurs or is detected and is then retracted to aid in clearing the short. In some processes this aids in clearing the short circuit quicker, and can result in a welding operation with lower overall heat input. However, in such applications, because of the wire control methodology, issues can occur during welding, such as inconsistent deposition rates during welding. This often occurs as the contact tip to work distance (CTWD) changes during some welding, as this can change the shorting frequency of the welding operation.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is a method and system of controlling the wire feeding and wire manipulation during a welding process such that the average wire feed speed of the welding operation is maintained at a desired rate and, in some embodiments is controlled independent of the welding parameters such as voltage or current.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to welding systems and welding processes. Specifically, embodiments of the present invention are directed to welding systems such as GMAW/MIG. However, it is noted that to the extent any specific welding operation type is discussed herein in the embodiments below, the discussion thereof is intended to be exemplary and not limiting to other exemplary embodiments of the present invention.

Figure 1:
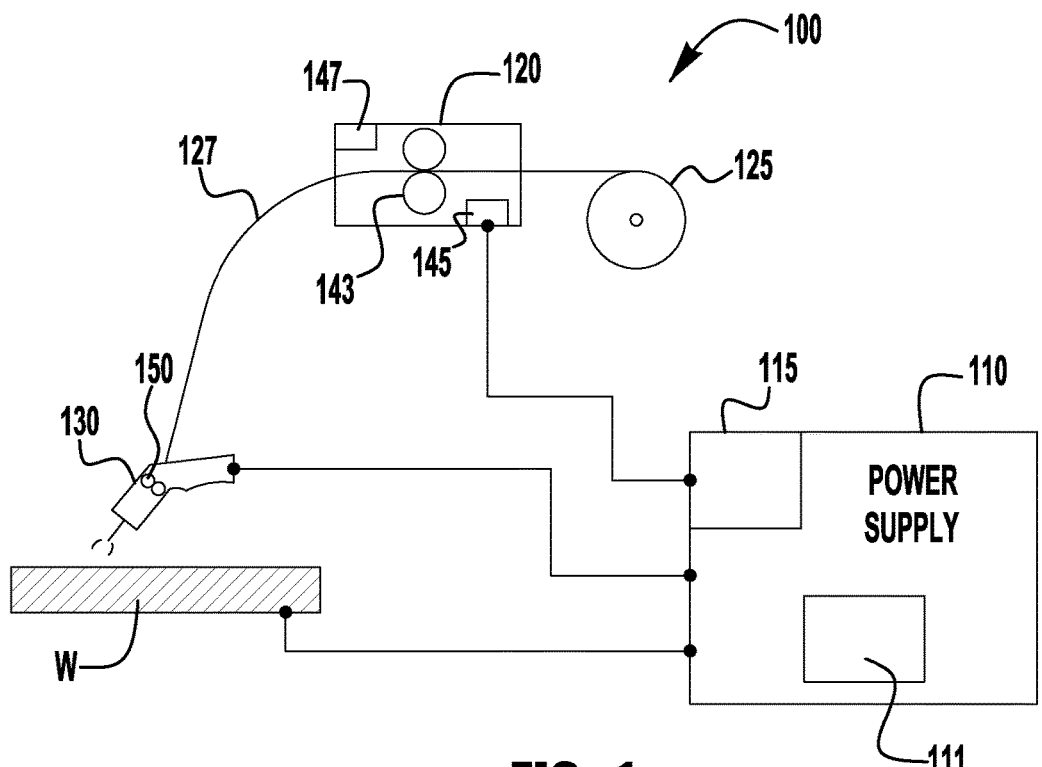
FIG. 1 is a diagrammatical representation of an exemplary welding system of the present invention.

Turning now to FIG. 1, an exemplary welding system of the present invention. The welding system 100 comprises a welding power supply 110 having a processor based controller 115 and a user interface/display 111. The power supply can be any type of known welding power supply, and embodiments of the invention are not limited thereto. For example, the power supply 100 can be a PowerWave, as manufactured by The Lincoln Electric Company of Cleveland, Ohio, although embodiments are not limited thereto. Because of the manufacture, construction and operation of such power supplies, with powerful and sophisticated controllers are known, they need not be described in detail herein. The controller 115 can be any known processor based controller cable of controlling the operation of the welding system, and can have a CPU, memory, etc. The display 111 can be any known type of display that displays operational data related to a welding operation, user input data and the like. The display can also be a touch screen type allowing user input data to be input via the screen 111.

The system 100 can also comprise a consumable source 125 from which a consumable 127 is supplied to a welding operation via a wire feeder 120, the operation of which is known. The wire feeder 120 can also have a controller 145 which can be coupled to the controller 115 of the power supply 110. In such embodiments data, information and control commands/instructions can be exchanged between the respective controllers. The wire feeder 120 can also have a user interface 147 to allow a user to input control information and weld process data into the wire feeder 120. Because of a communication coupling between the respective controllers (which can be via any known means, such as wired, wire or over the power cables) a user can control the welding operation via either the wire feeder 120 or the power supply 110. Such configurations are generally known and need not be described in detail herein. The wire 127 is delivered to a welding torch 130 of any known type for the welding of a workpiece or the weld metal W. As shown, and well known, the wire feeder 120 has a wire drive mechanism 143 which is capable of advancing and retracting the consumable 127 as described herein. Such systems can use motors, servos, rollers, etc. that grip the wire 127 and drive the wire in either an advancing or retracting direction. Because welding operations are widely known, they will not be described in detail herein.

Further, in some exemplary embodiments the welding torch 130 can have a wire drive mechanism 150 which is capable of assisting in the advancement and retraction of the wire. Such "push-pull" type torches are known and need not be described in detail herein. Further, the torch can use the wire drive mechanism 150, or other similar suitable mechanism in the torch 130, to provide feedback regarding the wire feed speed of the welding operation. Of course, other known systems can be used to provide wire feed speed feedback, such as systems within the wire feeder, so long as the feedback systems are capable of accurately monitoring the wire feed speed of the consumable 127. In exemplary embodiments, the wire feed speed feedback system (e.g., 150) provides the detected wire feed speed to the wire feeder 120 controller 145, which can then determine an average wire feed speed over an desired duration of time.

As explained above, in some welding operations it is desirable to advance and retract the wire 127 during the welding operation to provide a desired weld property and/or weld performance. For example, in some situations it is desirable to retract the consumable during and/or upon detection of a short event during welding. This can help clear the short quicker. However, because a shorting frequency can change during welding the wire feed speed of the welding operation will be changed. For example, during welding the CTWD can change (e.g., in manual or semi-automatic welding operations), and these changes will result in changes in the shorting frequency, and thus average wire feed speed. For example, as the shorting frequency decreases the average wire feed speed can increase because there will be less wire retraction events, and vice versa. These changes can result in an inconsistent metal deposition during the welding operation, for a given travel speed, etc. These changes can also result in other adverse effects to the welding process.

Figure 2:
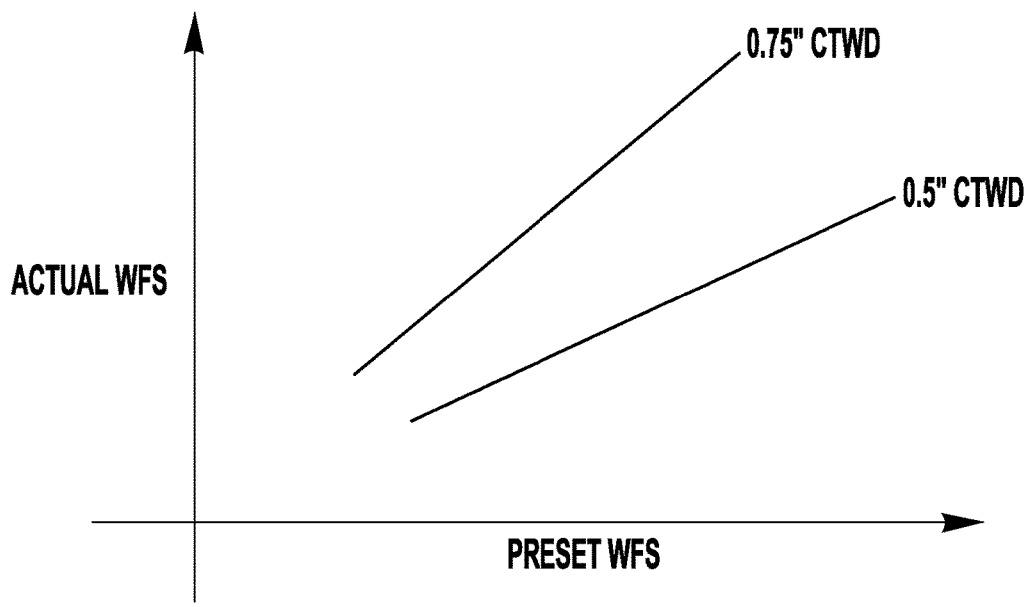
FIG. 2 is a diagrammatical representation of average wire feed speed at different CTWD distances.

FIG. 2 depicts relative relationships between the desired or preset wire feed speed and average wire feed speed for a CTWD for 0.5 inches and 0.75 inches respectively. As can be seen, depending the on the CTWD the slope defining the relationship between the desired wire feed speed and average wire feed speed changes. This can be a result of a different shorting frequency for a give welding operation, which is a result of a different CTWD.

Figure 3:
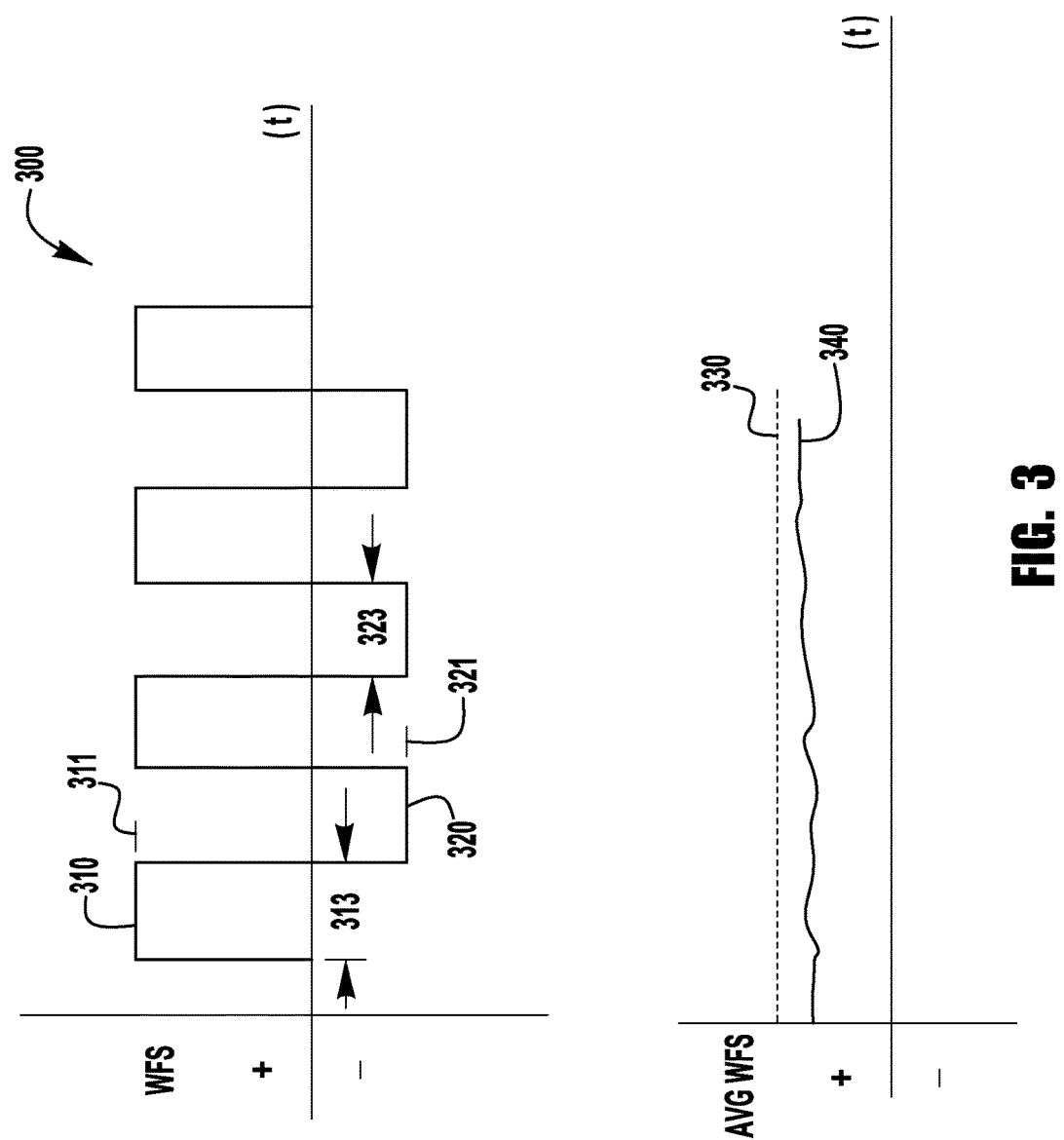
FIG. 3 is a diagrammatical representation of an exemplary wire feeding and average wire feed speed in embodiments of the invention.

Turning now to FIG. 3, which depicts an exemplary wire feed speed waveform 300 in accordance with an embodiment of the present invention. As shown, the waveform 300 has a plurality of positive pulses 310 and negative pulses 320, where the positive pulses represent wire advancement and the negative pulses represent wire retraction. Each positive pulse 310 has a peak WFS 311 and a duration 313, and the negative pulses 320 have a peak retraction speed 321 and a duration 323. Of course it should be noted that in exemplary embodiments, the duration of the respective pulses are not necessarily fixed but can be dictated by the shorting frequency, short duration, etc. of the welding process. However, each of the peak WFS values can be predetermined prior to the welding operation, and can be set by a user or can be determined by one of the respective controllers based on user input data regarding the welding operation.

Also shown in FIG. 3 is a graphical representation of a desired average WFS 330, shown as a dashed line, as compared to the actual/detected WFS 340. The average WFS 330 represents an average over a period of time, which can be predetermined in either or both of the controllers, and the detected average WFS 340 represents the actual average WFS for the welding operation. In FIG. 3 it is shown that the actual average 340 is less than the desired average 330. This can be a result of the CTWD being smaller than desired, which can result in an increase in the shorting frequency of the welding operation. This increase in shorting frequency will result in the wire spending more time in a retract state, than advancing, thus resulting in an actual average WFS which is less than desired. In the embodiment shown, the resultant weld will likely have a deposition rate less than desired as less consumable is being added to the weld. Embodiments of the present invention address this, as discussed further below.

Figure 4:
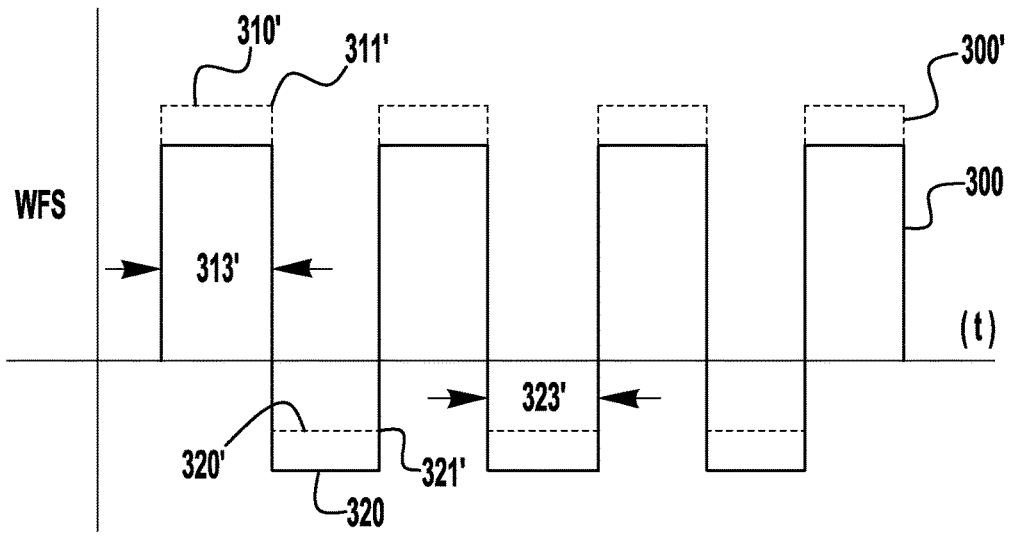
FIG. 4 is a diagrammatical representation of an adjustment to the wire feed speed/wire manipulation in accordance with an embodiment of the present invention.

FIG. 4 depicts an exemplary waveform of the present invention. The waveform 300 from FIG. 3 is shown for context. As shown, the system described herein adjusts the WFS waveform to achieve the desired average WFS. This can be done by increasing/decreasing the advancement and retraction peaks of the WFS pulses. For example, to increase the detected average WFS the system can cause the waveform to have higher positive peaks 311' and smaller negative peaks 321'. This results in an increase in the average WFS of the welding operation. To lower detected average WFS the positive peaks can be reduced and the negative peaks can be increased. By using this adjustment methodology, embodiments of the present invention can achieve improved WFS control during a wire manipulation welding process, independent of the control of current and/or voltage in a welding operation.

Specifically, in some exemplary embodiments, the welding arc current and/or voltage control are regulated separately from the wire feed speed. That is, in such system the power supply and/or wire feeder have voltage and/or current feedback and control circuits and systems that are capable of maintaining a desired current and/or voltage. Such systems are known and need not be described in detail herein. In some exemplary embodiments, the arc voltage and current feedback and control is entirely separate from the wire feed speed control as described herein. This is not to say that neither of the voltage and/or current are regulated, but the wire feed speed is not directly regulated based on arc voltage and/or current feedback, and the arc voltage and/or current is not directly controlled based on a detected wire feed speed. Such systems improve the operational efficiency of the system and allow the systems described herein to regulate wire feed speed in a desired fashion to provide consistent deposition of the consumable in the welding operation.

In the embodiment shown in FIG. 4, the peaks of each of the negative and positive pulses were adjusted to achieve the desired average WFS. However, this need not always be the case. For example, in some embodiments, when the need for adjustment is small only one of the respective peaks (i.e., positive or negative) can be adjusted. That is, in some exemplary embodiments if the actual average WFS is within a certain threshold or window relative to the desired average WFS only one of the positive or negative peaks is adjusted, and if the needed adjustment exceeds the threshold then each of the positive/negative peas are adjusted. For example, in some exemplary embodiments, if the detected average WFS is within 10% of the desired average WFS the peaks of only the positive pulses are adjusted, while maintaining the peaks of the negative (retraction) pulses, whereas if the detected average WFS exceeds the 10% threshold than each of the respective peaks are adjusted. In exemplary embodiments, this threshold value can be in the range of 2 to 20% of the desired or preset average WFS. In other exemplary embodiments, this threshold can be in the range of 5 to 12%. By only adjusting the positive pulses when needed, the short clearing aspects of the welding operation can be held consistent, with consistent wire retraction pulses. It should be noted that the above thresholds are intended to be exemplary for some embodiments, and in other embodiments other thresholds can be used. It is noted that the above percentages for ranges can also be used when using deposition rates, instead of wire feed speeds, as discussed herein.

In other exemplary embodiments, the controller of either the wire feeder 120 or the power supply 110 can determine which of the pulses is to be modified based on the type of welding operation being performed, along with other welding operation parameters. That is, for a given set of weld operation parameters it may be most desirable to adjust the average WFS via only the positive pulses of the WFS waveform, whereas in another given set of weld parameters it may be desirable to adjust only the negative peaks to achieve the desired WFS. Such weld process factors can include: welding process type, waveform type (e.g., STT, pulse, etc.), travel speed, consumable type (which can include construction, diameter, etc.), heat input, deposition rate, etc. Of course, embodiments can use any one, combination, or all of these parameters, as well as others not listed here, to determine the mechanics of the WFS modification to achieve the desired weld performance and weld goals. For example, a controller can utilize a look-up table or state table, or the like and based on the input parameters determine which WFS modification techniques can be implemented. Thus, in such embodiments a user can input the various needed weld process parameters, and the controller (either wire feeder or power supply) can determine the WFS control protocols that will be used for the process, including any needed threshold values. This is explained further below.

For example, for a first set of weld process parameters, it may be desirable to adjust only the peaks of the positive pulses (either slower or faster) to adjust the wire feed speed, and, again, for a second set of parameters the negative pulses should be adjusted. Of course, these embodiments can also employ the above discussed threshold values. For example, for a given set of parameters the controller can determine that the positive pulses should be adjusted first up to a threshold value, and if the differential in preset and actual WFS exceeds that threshold value then the negative pulses should also be adjusted. However, in exemplary embodiments, that threshold value may be different based on the welding parameters. For example, for a first set of welding parameters the controller determines that positive pulses should be adjusted when the detected average WFS is within 10% of the desired average WFS, but for a second set of parameters the controller also determines that positive pulses should be adjusted but the threshold value is 15%, beyond which the negative pulses should also be adjusted. Again, these determinations can be based on prepopulated look up tables, state tables or the like. Thus, embodiments of the present invention maximize and optimize control of the wire manipulation process during a given welding operation.

In the above described embodiments, the peaks of the pulses are modified, but in other embodiments the durations of the positive and/or negative pulses can be modified. In some embodiments, the durations are dictated by the short circuit clearing of the welding waveform, and as such may vary but would vary based only on the duration of the short circuit events. However, in other embodiments, the durations can be adjusted or be fixed in duration to achieve a desired average WFS. That is in some embodiments, the durations can be shortened or extended relative to the clearing of the short to adjust the average wire feed speed, while in other embodiments the durations can be fixed to set duration regardless of the duration of the short clearing. Again, the controller can use various user inputs to determine whether or not WFS pulse duration can be utilized to adjust or control the wire feed speed.

Figure 5:
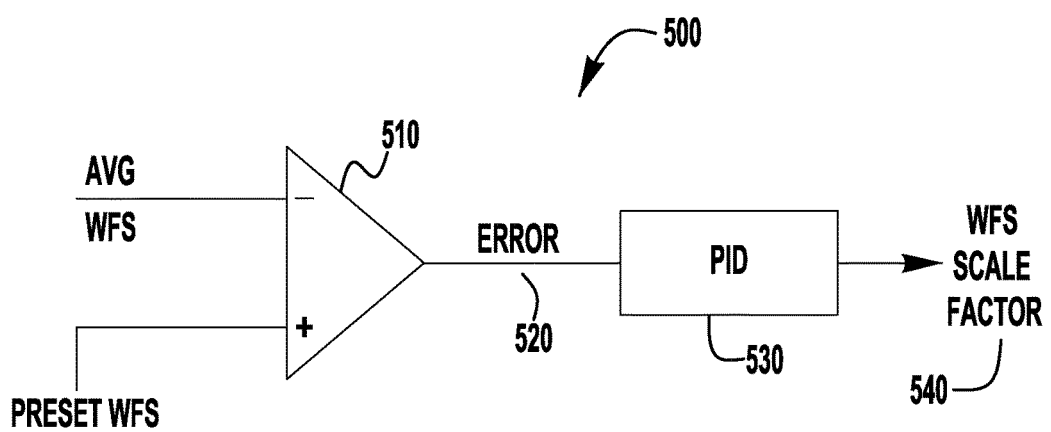
FIG. 5 is a diagrammatical representation of an control circuit that can be used to control the wire feed speed/wire manipulation of embodiments of the present invention.

FIG. 5 depicts an exemplary WFS control circuit, that can be utilized in the controller of either the wire feeder or the power supply. Of course, it should be noted that the system controller can also be located remotely from the system 100 without departing from the scope and spirit of the present invention, such as in a separate system controller, etc. As shown in FIG. 5, the control circuit 500 includes a comparator 510 which receives as input the detected average wire feed speed and the preset or desired average wire feed speed. The comparator compares each of the signals and outputs an error signal 520. The error signal 520 is provided to a proportional-integral-derivative controller (PID) 530 which then outputs a WFS scale factor 540. The scale factor 540 is then used by the controller to adjust the WFS waveform as described herein to achieve the desired output. For example, the controller can adjust the detected average wire feed speed by (1+WFS scale factor) to achieve the desired output. In exemplary embodiments, a PID can be used because the average WFS of a given welding operation is an integral of the total amount of wire provided to the weld over a period of time. Of course, the circuit 500 shown in FIG. 5 is exemplary and not intended to be limiting. Other feedback and control circuits can be used without departing from the spirit or scope of the present invention.

With the embodiments described above, contrary to known systems any mechanical issues present in the wire feed system are taken into account, and in some embodiments, the control of the WFS is independent of the control of the welding arc current and/or voltage, and a constant delivery of consumable can be maintained for a given welding operation.

In exemplary embodiments of the present invention, the oscillation of the welding wire can occur at frequency in the range of 50 to 200 Hz, and in other embodiments is in the range of 75 to 150 Hz. Further, in exemplary embodiments the filtering window for the average wire feed speed detection and determination is in the range of 5 to 25 Hz, and in other embodiments can be in the range of 10 to 20 Hz. Such filtering aids in ensuring that the determined average wire feed speed is not adversely influenced by noise, such as mechanical noise, which would interfere or adversely affect the data.

It is noted that while the above embodiments have been discussed in terms of WFS, other embodiments can use and monitor the deposition rate of the welding operation using similar methodologies described above without departing from the spirit or scope of the present invention. That is, a system can use wire feed speed along with information such as consumable diameter, to determine a deposition rate, and compare the determined deposition rate to an entered or desired deposition rate. That is, in some embodiments it may be desirable for a user to enter a deposition rate as a user input, as opposed to a wire feed speed. In such instances, embodiments of the present invention can easily function as described herein.

Figure 6:
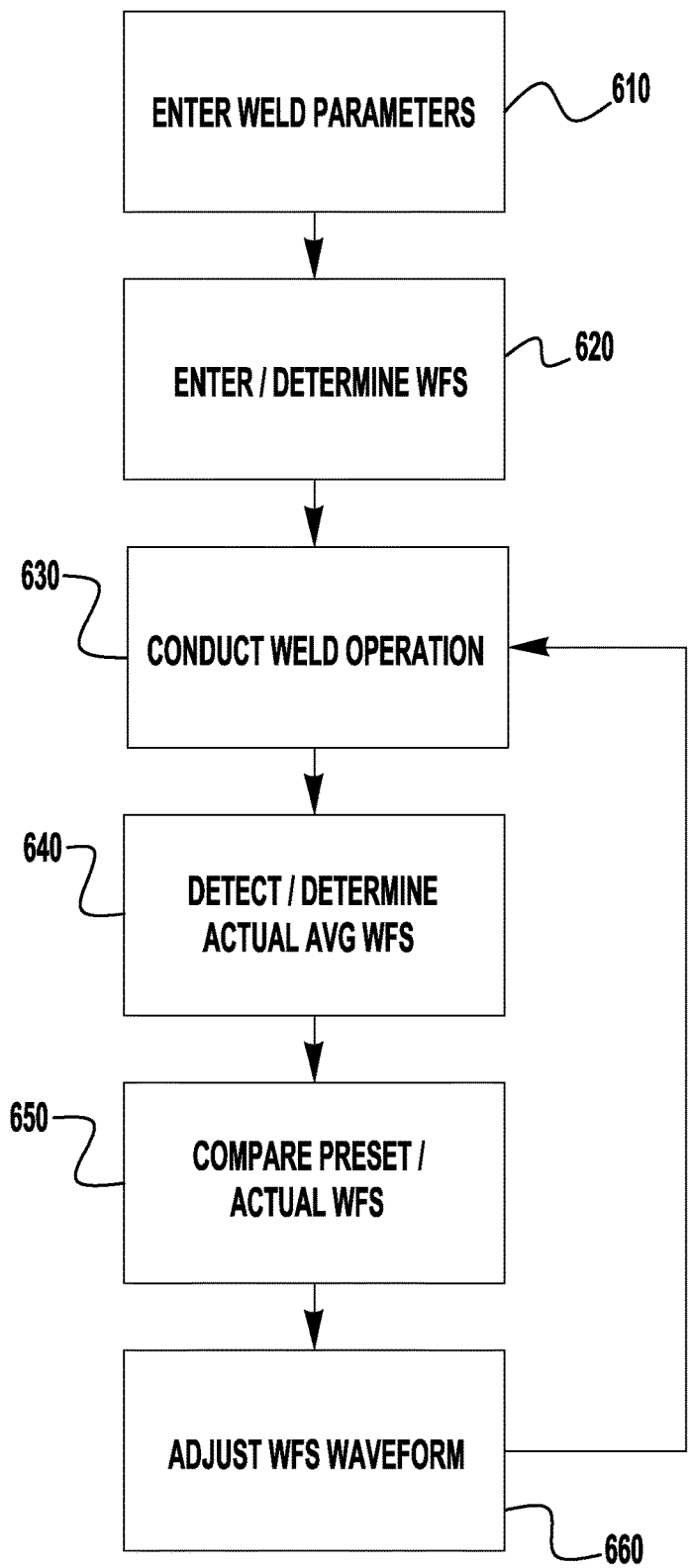
FIG. 6 is a diagrammatical representation of an exemplary flow chart for embodiments of the present invention.

FIG. 6 is a representative flow chart explaining an operation of exemplary embodiments of the present invention. Of course it should be noted that this flow chart is exemplary and not intended to be limiting and the order of the items shown below can be altered without departing from the spirit or scope of the operation. As shown, at least some weld parameters are entered into the controller and/or system for the welding operation, followed by entry of the desired average WFS. Of course, in some embodiments all of this information can be input at the same time/in the same step. Also, in other embodiments, the desired average WFS can be determined by the controller based on at least some of the data input in step 610 (e.g., welding process type, waveform type (e.g., STT, pulse, etc.), travel speed, consumable type (which can include construction, diameter, etc.), heat input, deposition rate, etc.). For example, for a given set of welding parameters the controller may have a predetermined desired WFS which would then be used for the welding operation. Further, in some embodiments, predetermined or pre-stored welding operations can be stored within the controller, or another memory, or uploaded to the controller having all of the desired information. The input welding parameters can include any of the parameters discussed herein, or any other weld parameters typically used for a given welding operation. In other exemplary embodiments, rather than a desired or present average WFS a desired deposition rate can be input, along with information regarding the consumable, such as diameter, and he controller uses this information to determine a desired WFS rate. Following the entry/determination of the desired deposition rate or WFS rate the welding operation can be commenced 630. During welding the system detects/determines the actual average WFS and/or deposition rate of the welding operation 640. This determination can be made as described herein, using any known feedback system. The detected information is then compared to the desired or preset information (WFS or deposition rate, or both) 650. Based on the comparison 650 the controller can then adjust the wire feed speed or deposition rate as described herein to achieve the desired result. For example this can be done by adjusting the wire feed mechanisms in either, or both, of, the wire feeder or the torch (if so equipped). This control methodology is then maintained during the welding operation to achieve a constant deposition rate, which is not achievable with known wire manipulation systems.

In the embodiments described above, the controller/processor that receives and analyzes the provided information is within the power supply and/or the wire feeder. However, in other exemplary embodiments this can be done via a separate computer device, including a handheld device like a laptop, tablet, etc. The controller need not be in the power supply or wire feeder, but can be.

While the subject matter of the present application has been described with reference to certain embodiments, it will be understood by those skilled in the art that various changes may be made and equivalents may be substituted without departing from the scope of the subject matter. In addition, many modifications may be made to adapt a particular situation or material to the teachings of the subject matter without departing from its scope. Therefore, it is intended that the subject matter not be limited to the particular embodiment disclosed, but that the subject matter will include all embodiments falling within the scope described herein.

What is claimed is:

1. A welding system, comprising:
a wire feeding mechanism having a wire drive mechanism which advances a welding wire and retracts said welding wire during a welding operation, where said advancement of said welding wire has a plurality of positive wire feed speed pulses and said retraction of said welding wire has a plurality of negative wire feed speed pulses,
a wire feed speed detection circuit which detects a wire feed speed of said welding wire during said welding operation, and
a controller coupled to said wire feeding mechanism and said wire feed speed detection circuit which determines an average wire feed speed for said welding operation based on said detected wire feed speed from said wire feed speed detection circuit, and where said controller compares said average wire feed speed with a desired average wire feed speed value,
wherein each of said positive wire feed speed pulses have a first pulse parameter and each of said negative wire feed speed pulses have a second pulse parameter and said controller changes at least one of said first and second pulse parameters based on a comparison of said determined average wire feed speed and said desired average wire feed speed value, and
wherein said welding operation has each of a welding arc voltage and a welding current and said first pulse parameter and said second pulse parameter are not directly regulated based on the welding arc voltage or the welding current, and
wherein the welding arc voltage and the welding current are not directly controlled based on the first pulse parameter or the second pulse parameter.

2. The system of claim 1, wherein said first pulse parameter is a positive peak wire feed speed and said second pulse parameter is a negative peak wire feed speed.

3. The system of claim 1, wherein each of said welding arc voltage and said welding current are regulated independently from changing of said first pulse parameter or said second pulse parameter.

4. The system of claim 1, wherein said controller changes said at least one of said first pulse parameter and said second pulse parameter when said determined average wire feed speed is within a first range of said desired average wire feed speed, and wherein said controller changes both of said first pulse parameter and said second pulse parameter when said determined average wire feed speed is not within said first range.

5. The system of claim 1, wherein a frequency of said positive wire feed speed pulses is in a range of 50 to 200 Hz.

6. The system of claim 1, wherein said desired average wire feed speed is determined by said controller based on at least one of a desired deposition rate, a consumable type, a travel speed, a heat input, a welding process type and a weld process waveform.

7. The system of claim 4, wherein said first range is within 2 to 20% of said desired average wire feed speed.

8. The system of claim 4, wherein said first range is within 5 to 12% of said desired average wire feed speed.

9. The system of claim 4, wherein said first range is determined by said controller based on at least one input weld process parameter.

10. A welding system, comprising:
a wire feeding mechanism having a wire drive mechanism which advances a welding wire and retracts said welding wire during a welding operation, where said advancement of said welding wire has a plurality of positive wire feed speed pulses and said retraction of said welding wire has a plurality of negative wire feed speed pulses,
a wire feed speed detection circuit which detects a wire feed speed of said welding wire during said welding operation, and
a controller coupled to said wire feeding mechanism and said wire feed speed detection circuit which determines an average deposition rate for said welding operation based on said detected wire feed speed from said wire feed speed detection circuit, and where said controller compares said determined average deposition rate with a desired average deposition rate, wherein each of said positive wire feed speed pulses have a first pulse parameter and each of said negative wire feed speed pulses have a second pulse parameter and said controller changes at least one of said first pulse parameter and said second pulse parameter based on a comparison of said determined average deposition rate and said desired average deposition rate, and wherein said welding operation has each of a welding arc voltage and a welding current and said first pulse parameter and said second pulse parameter are not directly regulated based on the welding arc voltage or the welding current, and wherein the welding arc voltage and the welding current are not directly controlled based on the first pulse parameter or the second pulse parameter.

11. The system of claim 10, wherein said first pulse parameter is a positive peak wire feed speed and said second pulse parameter is a negative peak wire feed speed.

12. The system of claim 10, wherein said controller changes said at least one of said first pulse parameter and said second pulse parameter when said determined average deposition rate is within a first range of said desired average deposition rate, and wherein said controller changes both of said first pulse parameter and said second pulse parameter when said determined average deposition rate is not within said first range.

13. A method of welding, comprising:
advancing and retracting a welding wire during a welding operation, where said advancing of said welding wire uses a plurality of positive wire feed speed pulses and said retracting of said welding wire uses a plurality of negative wire feed speed pulses, where each of said positive wire feed speed pulses have a first pulse parameter and each of said negative wire feed speed pulses have a second pulse parameter;
detecting a wire feed speed of said welding wire during said welding operation;
determining an average wire feed speed for said welding operation based on said detected wire feed speed;
comparing said determined average wire feed speed with a desired average wire feed speed value,
changing at least one of said first pulse parameter and said second pulse parameter based on said comparison of said determined average wire feed speed and said desired average wire feed speed value,
wherein said welding operation has each of a welding arc voltage and a welding current and said first pulse parameter and said second pulse parameter are not directly regulated based on the welding arc voltage or the welding current, and
wherein the welding arc voltage and the welding current are not directly controlled based on the first pulse parameter or the second pulse parameter.

14. The method of claim 13, wherein said first pulse parameter is a positive peak wire feed speed and said second pulse parameter is a negative peak wire feed speed.

15. The method of claim 13, further comprising regulating each of the welding arc voltage and the welding current independently from changing of said first pulse parameter or said second pulse parameter.

16. The method of claim 13, wherein said changing of said at least one of said first pulse parameter and said second pulse parameter is when said determined average wire feed speed is within a first range of said desired average wire feed speed, and further comprising changing both of said first pulse parameter and said second pulse parameter when said determined average wire feed speed is not within said first range.

17. The method of claim 13, further comprising determining said desired average wire feed speed based on at least one of a desired deposition rate, a consumable type, a travel speed, a heat input, a welding process type and a weld process waveform.

18. The method of claim 16, wherein said first range is within 2 to 20% of said determined average wire feed speed.

19. The method of claim 16, wherein said first range is within 5 to 12% of said determined average wire feed speed.

20. The method of claim 16, wherein said first range is determined by said controller based on at least one input weld process parameter.

* * * * *